US010788846B2

(12) United States Patent
Rogers

(10) Patent No.: US 10,788,846 B2
(45) Date of Patent: Sep. 29, 2020

(54) ACTIVE SURGE CHAMBER

(71) Applicant: Carlisle Fluid Technologies, Inc., Scottsdale, AZ (US)

(72) Inventor: John Anthony Rogers, Bournemouth (GB)

(73) Assignee: Carlisle Fluid Technologies, Inc., Charlotte, NC (US)

(*) Notice: Subject to any disclaimer, the term of this patent is extended or adjusted under 35 U.S.C. 154(b) by 0 days.

(21) Appl. No.: 16/069,869

(22) PCT Filed: Nov. 8, 2016

(86) PCT No.: PCT/IB2016/056718
§ 371 (c)(1),
(2) Date: Jul. 12, 2018

(87) PCT Pub. No.: WO2017/125802
PCT Pub. Date: Jul. 27, 2017

(65) Prior Publication Data
US 2019/0050004 A1     Feb. 14, 2019

(30) Foreign Application Priority Data

Jan. 22, 2016  (GB) .................................. 1601194.2

(51) Int. Cl.
*F16K 31/128*  (2006.01)
*G05D 16/06*  (2006.01)
(Continued)

(52) U.S. Cl.
CPC ...... *G05D 16/0688* (2013.01); *F04B 11/0008* (2013.01); *F04B 11/0016* (2013.01);
(Continued)

(58) Field of Classification Search
CPC ............ G05D 16/0688; F04B 11/0008; F04B 11/0016; F04B 11/0033; F04B 43/02; F04B 43/067; B05B 7/1459
(Continued)

(56) References Cited

U.S. PATENT DOCUMENTS 3,762,436 A * 10/1973 Clayton ............. G05D 16/0663
137/505.35
3,769,879 A * 11/1973 Lofquist, Jr. ......... F04B 39/044
92/84

(Continued)

FOREIGN PATENT DOCUMENTS

CN      2233494 Y    8/1996
CN      1788162 A    6/2006
(Continued)

OTHER PUBLICATIONS

GB Search Report for GB Application No. 1601194.2 dated Jul. 8, 2016, 3 pgs.
(Continued)

*Primary Examiner* — Minh Q Le
(74) *Attorney, Agent, or Firm* — Fletcher Yoder P.C.

(57) ABSTRACT

An active surge chamber for use in a paint supply system comprising a paint channel, a fluid chamber connected to a pressurised fluid supply, a diaphragm, a spring, and means responsive to movement of the diaphragm for effecting connection and disconnection of the pressurised fluid supply to the fluid chamber and for relieving pressure of fluid in the chamber. The paint channel is sealingly separated from the fluid chamber by the diaphragm. The spring has a spring rate such that the force exerted on the diaphragm by the spring restricts movement of the diaphragm over a selected range of pump outlet pressures in order to attenuate the movement of the diaphragm and reduce the susceptibility of the system to unwanted oscillation. Pressure fluctuations in a paint flow
(Continued)

induced by usage of a reciprocating pump upstream of the active surge chamber are minimised.

18 Claims, 4 Drawing Sheets

(51) Int. Cl.
    *F04B 11/00*     (2006.01)
    *F04B 43/02*     (2006.01)
    *B05B 7/14*     (2006.01)
    *F04B 43/067*     (2006.01)

(52) U.S. Cl.
    CPC .......... *F04B 11/0033* (2013.01); *F04B 43/02* (2013.01); *B05B 7/1459* (2013.01); *F04B 43/067* (2013.01)

(58) Field of Classification Search
    USPC ..... 137/489.5, 596.1, 596.2, 505.14, 505.36, 137/505.37
    See application file for complete search history.

(56) References Cited

U.S. PATENT DOCUMENTS

| | | | |
|---|---|---|---|
| 3,816,025 A * | 6/1974 | O'Neill | B05B 9/0409 417/9 |
| 4,416,599 A * | 11/1983 | De Longchamp | F04B 43/067 417/386 |
| 4,544,328 A * | 10/1985 | Credle, Jr. | B67D 1/103 222/66 |
| 5,246,351 A * | 9/1993 | Horn | F04B 43/067 417/387 |
| 5,797,430 A | 8/1998 | Beckë et al. | |
| 6,095,194 A * | 8/2000 | Minato | F04B 11/0016 138/26 |
| 6,386,509 B1 | 5/2002 | Mastuzawa et al. | |
| 6,481,982 B1 * | 11/2002 | Yokomichi | F04B 43/0081 251/30.01 |
| 7,654,801 B2 * | 2/2010 | Spude | F04B 43/0081 417/386 |
| 2012/0104303 A1 | 5/2012 | Chizek et al. | |
| 2016/0123319 A1 * | 5/2016 | Hembree | F04B 53/06 417/398 |
| 2019/0093652 A1 * | 3/2019 | Reinhard | F04B 43/0081 |

FOREIGN PATENT DOCUMENTS

| | | |
|---|---|---|
| CN | 201162663 Y | 12/2008 |
| CN | 203500603 U | 3/2014 |
| EP | 0707173 A1 | 4/1996 |
| EP | 0943799 A2 | 9/1999 |
| EP | 1079169 A1 | 2/2001 |
| GB | 1364790 A | 8/1974 |
| JP | S57097085 A | 6/1982 |
| JP | H02186101 A | 7/1990 |
| JP | H06017752 A | 1/1994 |
| JP | H08159016 A | 6/1996 |
| JP | H11270458 A | 10/1999 |
| JP | H11270459 A | 10/1999 |
| JP | 2001115950 A | 4/2001 |
| JP | 2001123959 A | 5/2001 |
| JP | 2006029302 A | 2/2006 |
| JP | 2008089081 A | 4/2008 |

OTHER PUBLICATIONS

International Search Report and Written Opinion for PCT Application No. PCT/IB2016/056718 dated Jan. 19, 2017, 10 pgs.
Japanese Search Report for JP Application No. 2018537844, dated Jul. 3, 2020, 14 pgs.
Japanese Office Action for JP Application No. 2018537844, dated Aug. 4, 2020, 10 pgs.

* cited by examiner

ACTIVE SURGE CHAMBER

FIELD OF THE INVENTION

The present invention relates to an active surge chamber suitable for use with reciprocating pumps in paint supply systems.

BACKGROUND TO THE INVENTION

In paint supply systems it is common to use a reciprocating pump to move paint throughout the system. A reciprocating pump typically consists of a piston that is positioned inside a cylinder. The piston is driven in a reciprocating motion inside the cylinder. A pumping action is provided to pump paint, or any other fluid, with the aid of an inlet and outlet valve. When the piston is driven in one direction during 'the upstroke,' paint is pulled into the cylinder via the inlet valve while the outlet valve is closed. When the cylinder is driven in the opposite direction during 'the downstroke,' paint is pushed out of the cylinder via the outlet valve while the inlet valve is closed. Therefore as paint passes through the reciprocating pump kinetic energy is transferred from the piston to the paint in order to pump paint around the system.

An inherent feature of reciprocating pumps used in paint supply systems is that there is a sudden drop in paint pressure at the point where the pump direction is reversed. Devices such as active surge chambers are used to maintain the system pressure downstream of the pump and overcome this sudden drop in paint pressure.

Typically an active surge chamber for use with paint supply systems consists of a fluid chamber and a paint channel. The fluid chamber has a pressurised fluid source and an exhaust. The fluid chamber and paint channel are sealingly separated by a flexible diaphragm. A momentary change of pressure in the paint flow due to the pump direction reversal will initially cause the diaphragm to start to deflect. Mechanisms in the fluid chamber react on this deflection to ensure that pressure in the fluid chamber is increased or decreased by charging or exhausting fluid in the fluid chamber in order to maintain the diaphragm at or near a neutral position. The effect of this is that the diaphragm exerts an appropriate force on the paint flow in order that the pressure in the paint flow downstream of the active surge chamber is maintained at a near-constant level.

Current devices are suitable for maintaining a constant system pressure where the type of reciprocating pump used is a piston pump. Piston pumps typically maintain a relatively stable pressure output over a single stroke. However other pumps exist that do not maintain such a stable pressure output over a single stroke, such as diaphragm pumps. When current active surge chambers are used in combination with these types of pumps the system is prone to unwanted oscillation, so called 'hunting'. In certain situations it is favourable to use diaphragm pumps instead of piston pumps due to ease of cleaning, and reduced risk of contamination of the fluid, for example from lubricants.

With the above in mind, it is an aim of the present invention to provide an improved active surge chamber.

SUMMARY OF THE INVENTION

According to a first aspect of the present invention there is provided an active surge chamber for use with a pump in a paint supply system, said active surge chamber comprising a paint channel, a fluid chamber for connection to a pressurised fluid supply, a diaphragm, a spring, and means responsive to flexion of the diaphragm for effecting connection and disconnection of the pressurised fluid supply to the fluid chamber and for relieving pressure of fluid in the chamber. Said paint channel is sealingly separated from the fluid chamber by the diaphragm and the spring acts on the diaphragm and has a spring rate such that the force exerted on the diaphragm restricts movement of the diaphragm over a selected range of pump outlet pressures. The force exerted on the diaphragm attenuates the movement of the diaphragm due to the variation of paint pressure for a range of movement of the diaphragm in which said means responsive to flexion of the diaphragm does not effect connection of the pressurised fluid supply to the fluid chamber, or relieve pressure of fluid in the fluid chamber.

Use of the spring of specific spring rate is advantageous since it reduces the likelihood of the system to unwanted oscillation, so called "hunting". It is an aim of the present invention that during operation the diaphragm, which is attached to the spring, remains positioned near a neutral position, a neutral position being defined as a position equidistant from first and second extremities of flexion that the diaphragm may be subjected to. A "passive range" is the range of pressure variation of the paint that is tolerated during pump operation without engaging the means of varying the pressure in the fluid chamber. The spring rate is such that the force applied by the paint due to variations in pressure within the passive range will not allow the membrane to flex to such an extent that the means of effecting connection and disconnection of the pressurised fluid to the fluid supply and for relieving pressure of fluid in the chamber is activated. Therefore there is no change in the pressure within the fluid chamber when there are variations in pressure that are within the passive range. However when there is a change in paint pressure that is outside the passive range, the means of effecting connection and disconnection of the pressurised fluid to the fluid supply and for relieving pressure of fluid in the chamber is activated by movement of the diaphragm. Therefore the force on the diaphragm exerted by the spring, in combination with the force on the diaphragm due to the difference in pressure between the paint in the paint channel and fluid in the fluid chamber, causes the diaphragm to remain near a neutral position.

It is to be understood that if the spring rate is too high or too low the fluid pressure in the fluid chamber will fluctuate with pump output pressure and not sit in a stable equilibrium state near a neutral position.

The active surge chamber may further comprise a spool cooperable with the diaphragm and configured to move on flexion of the diaphragm for effecting connection and disconnection of the pressurised fluid supply to the fluid chamber, and for relieving pressure of fluid in the fluid chamber.

According to a second aspect of the invention there is provided an active surge chamber for use with a pump in a paint supply system. The active surge chamber comprises a paint channel, a fluid chamber having an exhaust passage, an inlet for connection to a pressurised fluid supply and is sealingly separated from said paint channel by a diaphragm. A spring is arranged to exert a force on said diaphragm. A spool is responsive to flexing of the diaphragm to move between a charging position, in which the inlet of the chamber is opened to admit pressurised fluid while the exhaust passage is closed, and an exhausting position in which the inlet is closed and the exhaust passage is opened. Movement of said spool includes an intermediate position in which both said inlet and said exhaust passage are closed.

The force exerted by said spring on said diaphragm restricts movement of the diaphragm over a range of paint pressures in order to attenuate the movement of the spool in said intermediate position.

In embodiments of the first or second aspects, the active surge chamber may further comprise an exhaust passage for fluid in the fluid chamber wherein the spool is configured to move in such a way that fluid in the fluid chamber comes into fluid communication with the exhaust passage in order that fluid may be exhausted from the fluid chamber. When the fluid in the fluid chamber is in fluid communication with the exhaust passage, the active surge chamber is in the exhausting condition.

In embodiments of the first or second aspects, the active surge chamber may further comprise at least one seal located on the spool wherein said seal or seals are configured to block fluid flow from the pressurised fluid supply to the fluid chamber and fluid flow from the fluid chamber to the exhaust passage when the spool is at a first range of positions. Said seal or seals are also configured such that fluid flow from the pressurised fluid supply to the fluid chamber and fluid flow from the fluid chamber to the exhaust passage is enabled when the spool is at a second range of positions. When the fluid in the fluid chamber is in fluid communication with the pressurised fluid supply, the active surge chamber is in the charging condition.

The use of a seal or seals located on the spool is advantageous in that fluid flow from a pressurised fluid supply or to an exhaust passage may be prevented or enabled based on the position of the spool.

In embodiments of the first or second aspects, the active surge chamber may further comprise a shaft that is connected to the diaphragm at one end and configured such that flexion of the diaphragm causes movement of the shaft. Movement of the shaft engages the spool and causes the spool to move. The shaft may be circular and located in a circular bore where there is space in between the shaft and the channel for the spool, which may also be circular.

The bore may have a chamber connecting hole, and a pressurised air supply hole located in the wall of the bore. The chamber connecting hole may lead to the fluid chamber and the pressurised air supply hole may lead to the pressurised air supply. The advantage of placing these holes in the bore is that they can be sealed or unsealed by movement of seals within the bore.

The spool may surround the shaft so that there is an annular space between the spool and bore wall. The annular space may be sealed from the space between the bore wall and the shaft, hereafter referred to as the "bore space" by the use of a seal at each end of the spool such that the spool may move within the bore whilst no fluid may enter the bore space from the annular space. The spool seals are hereafter referred to as the "upper spool seal" and the "lower spool seal". The upper spool seal refers to the seal that is located furthest away from the diaphragm. The "lower spool seal" refers to the seal that is located closest to the diaphragm. Said annular space is always in fluid communication with the pressurised fluid supply due to the placement of a fluid supply hole in the bore wall connecting the pressurised fluid supply with the annular space. The annular space is not always in fluid communication with the fluid chamber due to the position of the upper spool seal over the chamber connecting hole. When the spool is at a particular position along the shaft, the annular space becomes in fluid communication with both the pressurised fluid supply and fluid chamber so that fluid may enter the fluid chamber from the pressurised fluid supply via the annular space and holes.

The use of said annular space is advantageous in that the spool may be moved whilst a fluid connection to the pressurised fluid supply is maintained to the annular space via the fluid supply hole. A fluid connection to the fluid chamber to the annular space may be engaged or disengaged by movement of the entire spool with upper and lower spool seals, and associated annular space.

The shaft may be configured to move a first distance before engaging the spool such that the diaphragm may be flexed by a predetermined amount without causing movement to the spool. This is advantageous in preventing unwanted pressure fluctuations in the fluid chamber if the diaphragm flexes by amounts that do not cause the shaft to move as far as said first distance.

The shaft may further comprise an end flange located near the opposite end to that which is connected to the diaphragm and a pair of shaft seal flanges flanking a shaft seal located around the shaft at a position along the shaft between the diaphragm and the spool. A set degree of flexion of the diaphragm causes contact of said end flange or one of said shaft seal flanges with the spool in order to effect spool movement if the spool is located between said end flange and pair of seal flanges. The advantage of the end flange is that the spool may be engaged when the shaft is pulled towards the paint fluid chamber due to flexion of the diaphragm. Such movement of the spool can allow the fluid chamber to come into fluid communication with the exhaust passage due to movement of the upper spool seal. One of the pair of seal flanges may engage the spool if the shaft is pushed away from the paint fluid chamber due to flexion of the diaphragm, and the shaft seal may form a seal with the bore wall to prevent chamber fluid from interacting with the spool and allowing movement of the shaft.

In embodiments of the first or second aspects the diaphragm may be connected to the shaft. From here on "upwards" movement refers to movement of the shaft such that the volume of the paint channel is increased by diaphragm flexion, and "downwards" movement refers to movement of the shaft such that the volume of the paint channel is decreased by diaphragm flexion.

If there is a drop in the channel paint pressure, the upper spool seal may move downwards to a point due to movement of the shaft caused by the resultant movement of the diaphragm and the shaft. The exhaust passage is an extension of the bore and would then come into fluid communication with the chamber fluid via the chamber connecting hole. The exhaust passage is at a lower pressure than the fluid chamber pressure and therefore the fluid chamber fluid is exhausted and the system enters the "exhausting" condition.

If there is an increase in the channel paint pressure, the upper spool seal may be moved upwards to a point so that the fluid from the fluid chamber is in fluid communication with the annular space between the spool and the shaft. Fluid may then flow freely from the pressurised fluid supply to the fluid chamber via the annular space and chamber connecting hole. This would cause the chamber fluid to increase in pressure and the system to enter the "charging" condition.

This system effectively forms a feedback system where chamber fluid is exhausted or charged due to variation in the paint pressure in order to maintain the diaphragm at a near-neutral position and equalise the pressure in the paint flow.

In embodiments of the first or second aspects, the active surge chamber may be connected to a reciprocating pump such as a diaphragm pump where the objective is to reduce the pressure fluctuations of paint that is being pumped. The system may reduce pressure fluctuations in the paint flow by ensuring that the diaphragm remains close to or at the neutral position by utilising the resultant forces due to the regulation of pressure within the fluid chamber and the spring, to apply appropriate force on the paint via the diaphragm in order to regulate the pressure therein.

In addition to the benefits described above, the spring is also advantageous in that the force it provides may compensate for the loss of area that the chamber fluid acts upon caused by the shaft connection to the diaphragm. The fluid pressure in the fluid chamber may be reduced to less than the paint pressure in the channel which is advantageous in ensuring the device can operate over a complete paint pressure range from the pump.

In embodiments of the first or second aspects, the active surge chamber may further comprise a fluid reservoir wherein said reservoir is connected to the fluid chamber in order to increase the overall volume of the fluid chamber. This is advantageous in that the overall volume of the fluid chamber is increased so that the change in fluid pressure when the diaphragm flexes during pump change of direction is minimised.

In embodiments of the first or second aspects, the surge chamber may further comprise a piston coupled for movement with the diaphragm and having a piston seal surrounding the piston allowing slidable movement of the piston in a secondary chamber which is in fluid communication with the fluid chamber, wherein pressure of the fluid in the secondary chamber acts on said piston to provide an additional force on the diaphragm. The piston rod may be slidable in the bore and connected to the shaft.

The fluid in the secondary chamber may apply a force upon the flat surface of the piston head. The opposing surface of the piston head and piston rod does not interface with the pressurised fluid of the fluid chamber or secondary chamber.

In embodiments of the first or second aspects, the active surge chamber may further comprise a duct that is in fluid connection with the fluid chamber and the secondary chamber. Therefore the pressure in the fluid chamber is equal to that in the secondary chamber.

The piston may be coupled for movement with the diaphragm via connection with the shaft.

In embodiments of the first or second aspects, the active surge chamber may further comprise a gap between the piston, shaft, and bore wall configured to channel fluid flow to the exhaust passage if the gap comes into fluid connection with the fluid chamber.

An advantage of the use of this piston is that the surface area upon which the pressure of the fluid of the fluid chamber acts is increased by the surface area of the piston head flat surface. This allows the active surge chamber to work with higher ratio diaphragm pumps and higher paint flow pressures than would be possible with previous embodiments whilst the pressure of the fluid in the fluid chamber remains at a similar level to that in previous embodiments.

In embodiments of the first or second aspects there may be a pressure gauge attached such that the pressure of the fluid in the fluid chamber may be measured.

DETAILED DESCRIPTION

Figure 1:
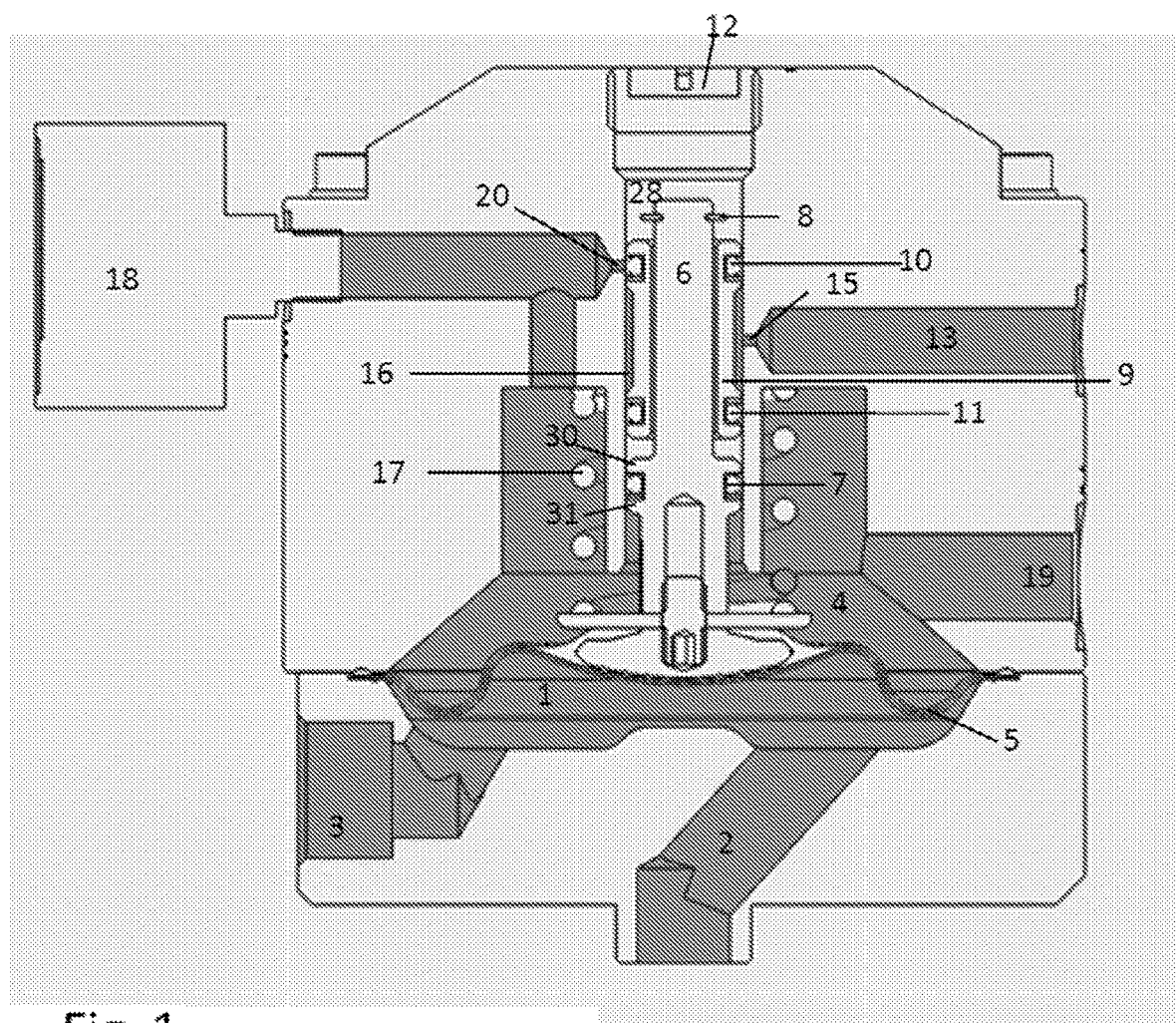
FIG. 1 shows an active surge chamber in accordance with an embodiment of the present invention in a stable working condition.
Figure 2:
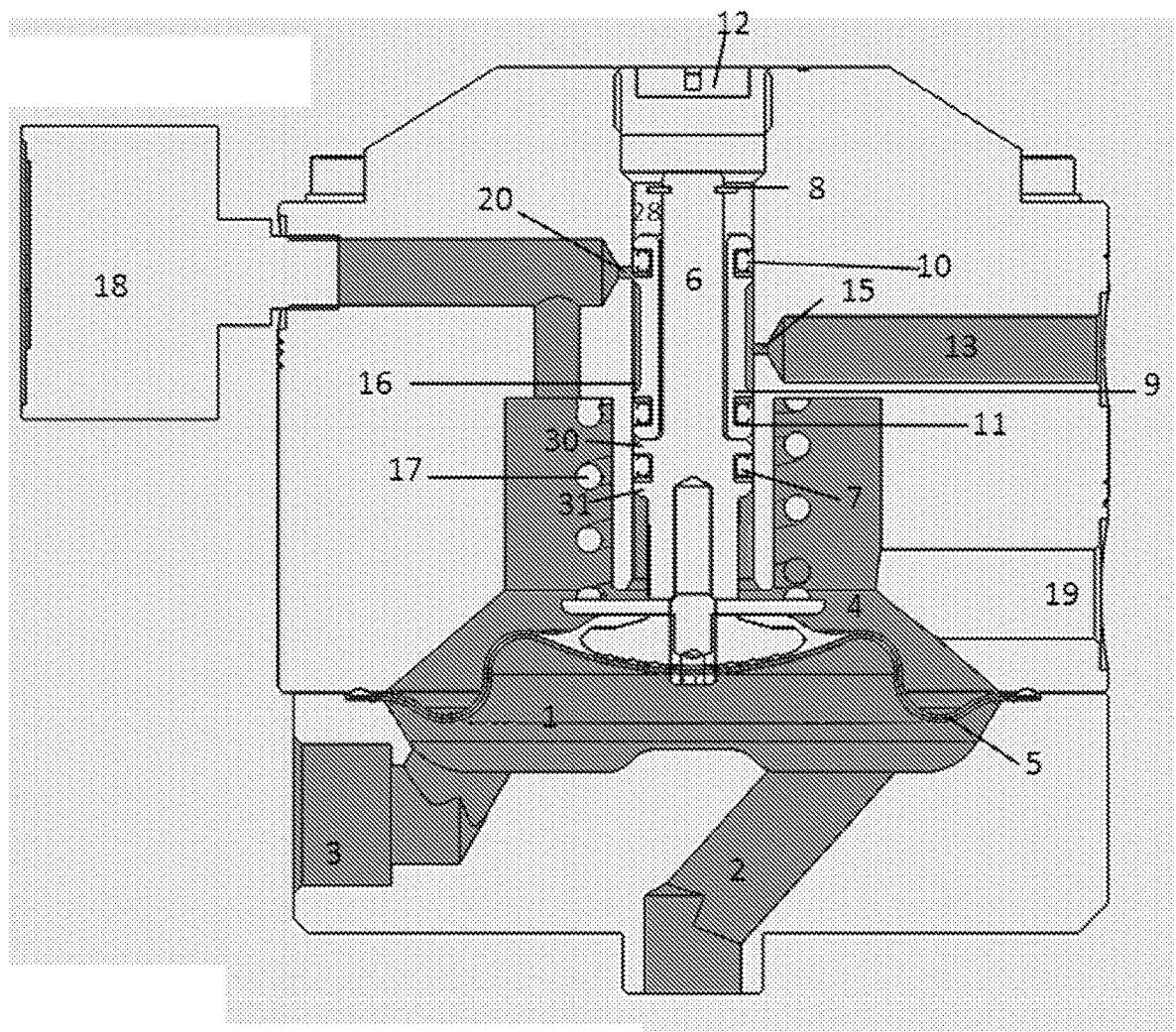
FIG. 2 shows an active surge chamber in accordance with an embodiment of the present invention in a chamber fluid charging condition.
Figure 3:
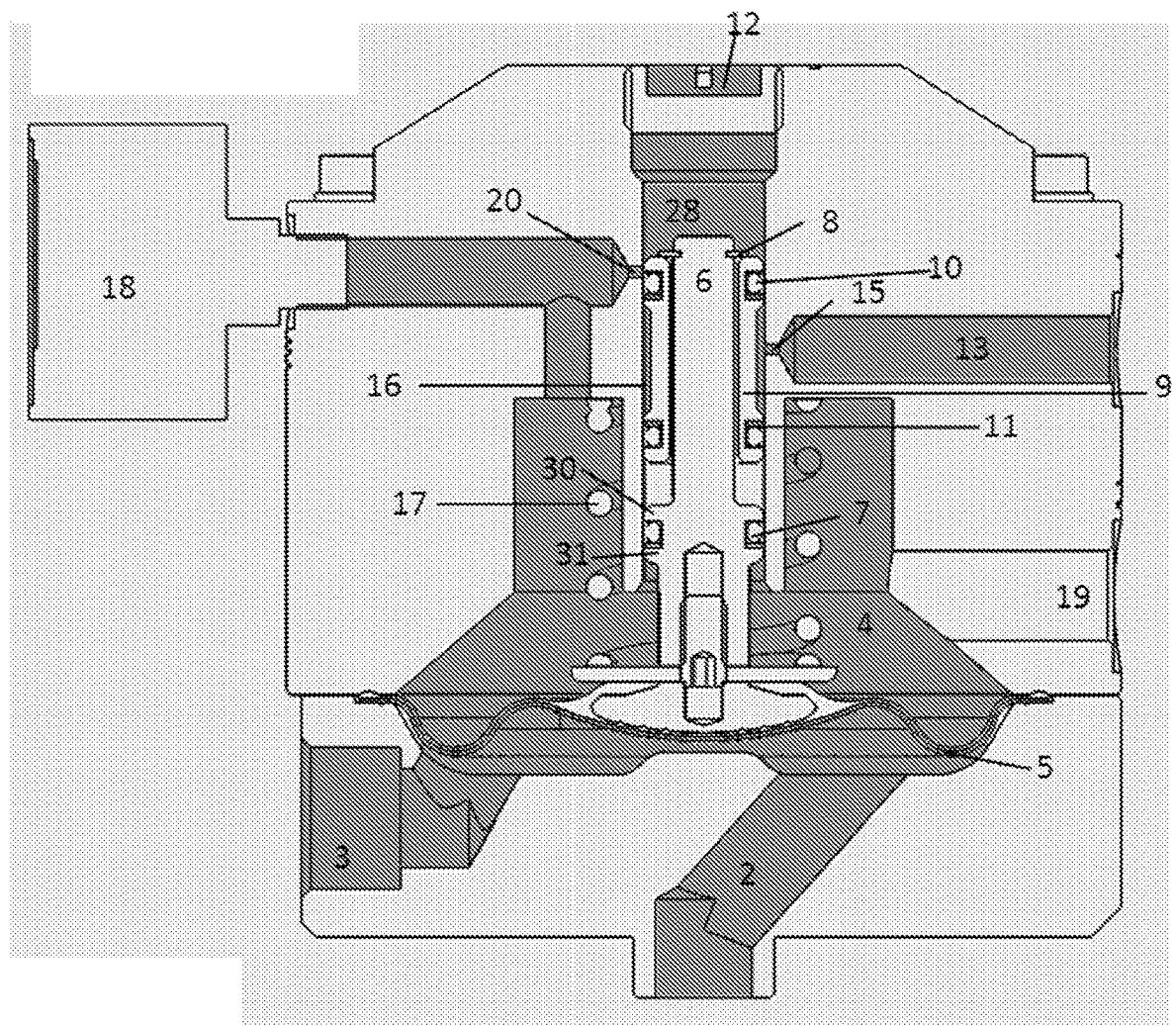
FIG. 3 shows an active surge chamber in accordance with an embodiment of the present invention in a chamber fluid exhausting condition.

With reference to FIGS. 1-3, there is illustrated an active surge chamber for use with a diaphragm pump.

There is a paint channel 1 which may be fed by a diaphragm pump (not shown). In the embodiment shown the paint may flow into the paint channel 1 via a conduit 2, and flow out via a conduit 3. In other embodiments there may only one conduit that is connected to the paint supply system in a "tee" arrangement where paint flows in and out through the same conduit. The paint channel 1 is separated from 4 by a flexible diaphragm 5 that is secured and sealed such that the chamber fluid and paint in paint channel 1 are never in contact. The chamber fluid is typically compressed air, and will be referred to as air in the following description. However other fluids could be used, such as another gas or a hydraulic fluid.

A shaft 6 is attached to the diaphragm 5 and contained in a bore 28. A shaft seal 7, end flange 8, and pair of seal flanges 30, 31 are situated on the shaft 6. The shaft seal is situated between the pair of seal flanges hereby referred to as top seal flange 30 and bottom seal flange 31. A spool 9 with an upper spool seal 10 and lower spool seal 11 is placed around the shaft 6. The spool 9 is placed such that if the shaft is displaced by more than a predetermined amount the spool will come into contact with either the end flange 8 or the top seal flange 30. At the point of contact with the end flange 8 or the top seal flange 30, the shaft spool 9 will move downwards or upwards respectively. Movement of the spool 9 also causes movement of the annular area 16 that exists between the spool seals 10, 11 and the bore wall. The spool seals 10, 11 prevent air from the annular area entering the bore space outside the annular area whilst allowing the spool 9 to be moved. The shaft seal 7 separates the air chamber 4 from the spool 9 so that air in the air chamber does not exert a force on the spool. An exhaust 12 is located above the shaft 6 and is linked to the bore.

A pressurised air supply is connected via an air supply inlet 13 to the annular area 16 by an air supply hole 15 such that air from the air supply fills the annular area 16 between the upper spool seal 10 and lower spool seal 11. The pressure of the air supply will be greater than that of the air chamber 4.

A spring of specific spring rate 17 is attached to the diaphragm 5 on the air chamber side. The spring 17 is a helical spring that is disposed in the air chamber 4 and surrounds the shaft 6 and bore 28.

A pressure gauge 18 is mounted on the air chamber such that the pressure within the air chamber may be measured. An air reservoir (not shown) is connected to a port 19 on air chamber 4 in order to increase the overall air pressure and reduce the change in air pressure when the diaphragm 5 flexes.

The diaphragm 5 is able to flex by a predetermined amount without effecting movement of the spool 9 and associated seals 10, 11 due to the positioning of the flange 8 and seal flange 30.

In use, if the paint pressure increases to above the passive range then diaphragm 5 will flex upwards to such a degree and the spring 17 will compress so that the shaft 6 will move and cause the spool 9 to come into contact with the top seal flange 30 thereby being pushed upwards. The active surge chamber will now be in the charging condition as specifically shown in FIG. 2. This will allow the chamber connecting hole 20 to come into contact with the high pressure air supply via the annular area 16. The chamber air will be charged from the air supply and the resulting higher pressure of the chamber air will exert a force on the diaphragm 5 thereby pushing it downwards in order to return the diaphragm 5 to a near neutral position and counter the pressure increase in the paint flow. As the diaphragm 5 returns to the neutral position the shaft 6 will be pulled down resulting in the spool interacting with the shaft flange 8 and the chamber connecting hole 20 being sealed by the upper spool seal 10. The pressure of the air in the air chamber 4 is now at a level required to maintain the diaphragm 5 at the neutral state until there is another change in the paint pressure.

Conversely if the paint pressure decreases to below the passive range then the diaphragm 5 will flex to such a degree that the shaft 6 will cause the spool 9 to be pushed down by the shaft flange 8. The active surge chamber is now in the exhausting condition as specifically shown in FIG. 3. Due to the unsealing of the chamber connecting hole 20 by this movement, the air in the air chamber is now exposed to the exhaust passage 12 via the bore 28 where there is a lower pressure. Therefore the air in the air chamber is exhausted and pressure in the air chamber 4 is relieved, allowing the diaphragm 5 to flex back towards a neutral state. When the diaphragm is near the neutral position the chamber connecting hole 20 is sealed by the upper spool seal 10, thereby stopping the exhausting of the air from the air chamber 4.

The spring of specific spring rate 17 is attached to the diaphragm 5 on the air chamber side. The spring constant of spring 17 is such that the spring restricts flexion of the diaphragm when the pressure variations are within the passive range. Therefore the resulting flexion of the diaphragm 5 due to these levels of pressure variations is not sufficient to move the shaft 6 far enough for it to enable means of pressure variation in the air chamber 4. This reduces the susceptibility of the system to oscillation or so called "hunting".

A channel 19 leads to an air reservoir (not shown) that increases the overall air chamber volume. This is advantageous since the resulting greater volume of air reduces the change in air pressure of the air chamber 4 caused by the deflection of the diaphragm 5 during pressure variations caused by the pump change of direction.

Figure 4:
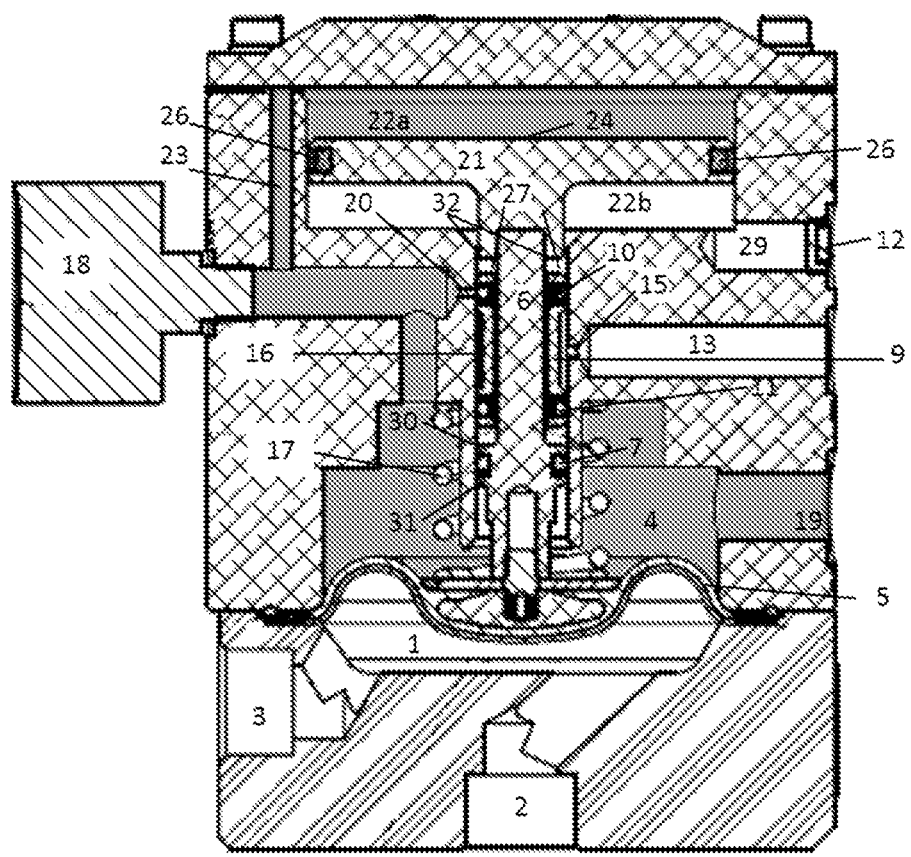
FIG. 4 shows an active surge chamber in accordance with an embodiment of the present invention with additional piston as referred to in claim 8.

With reference to FIG. 4 an embodiment of the present invention incorporates a piston 21 located in a secondary chamber 22 that is connected to the air chamber 4 via a duct 23. The pressure of air in the air chamber 4 is equal to that in the secondary chamber 22. The piston 21 has a head that divides the secondary chamber 22 into an upper secondary chamber 22a and lower secondary chamber 22b. The piston 21 is coupled to the shaft 6 and there is a lower rod surface 32 on the underside of piston 21 that is normal to the shaft surface and bore wall, and opposite the top of the spool 9.

In use, the pressure in the secondary chamber 22 exerts a force on the piston 21 in the same direction as the forces exerted by the spring 17, and the force exerted by the diaphragm 5 due to the air pressure in the air chamber 4. The means of controlling the air pressure in air chamber 4 via movement of the spool 9 is the same as the previously described embodiment with the exception that when the system is in the exhausting condition, the spool 9 is pushed downwards due to engagement with the lower rod surface 32.

Due to the coupling of piston 21 is with the diaphragm 5 via the shaft 6, the force exerted by the piston 21 assists the force that is provided by both the spring 17, and pressurised air on diaphragm 5. The piston head 21 is surrounded by a seal 26 in order to prevent pressurised air entering the lower secondary chamber 22b. The lower secondary chamber 22b is not pressurised so that any force exerted on the top of the piston head 24 aids the other forces provided by other parts of the system.

There is a gap 27 above the spool 9 bounded by the bore wall, shaft 6 and piston 21. When in the exhausting condition the gap 27 is in fluid contact with the chamber connecting hole 20 therefore fluid may enter the exhaust passage 29 and exit the system via the silencer 12.

The invention claimed is:

1. An active surge chamber for use with a pump in a paint supply system, the active surge chamber comprising:
   a paint channel;
   a fluid chamber for connection to a pressurised fluid supply;
   a diaphragm;
   a spring; and
   a spool moveable in response to flexion of the diaphragm for effecting connection and disconnection of the pressurised fluid supply to the fluid chamber, and for effecting relief of pressure of fluid in the fluid chamber;
   wherein,
   the paint channel is sealingly separated from the fluid chamber by the diaphragm;
   the spring acts on the diaphragm and has a spring rate such that a force exerted on the diaphragm by the spring restricts movement of the diaphragm over a selected range of pump outlet pressures in order to attenuate the movement of the diaphragm due to a variation of paint pressure for a range of movement of the diaphragm in which the spool does not effect connection of the pressurised fluid supply to the fluid chamber, and does not effect relief of pressure of fluid in the fluid chamber; and
   a fluid reservoir wherein the fluid reservoir is connected to the fluid chamber in order to increase an overall volume of the fluid chamber.

2. The active surge chamber of claim 1 further comprising an exhaust passage for fluid from the fluid chamber wherein the spool is configured to move in such a way that fluid in the fluid chamber comes into fluid communication with the exhaust passage in order that fluid may be exhausted from the fluid chamber.

3. The active surge chamber of claim 2 further comprising at least one seal located on the spool wherein
   the seal or seals are configured to block fluid flow from the pressurised fluid supply to the fluid chamber and fluid flow from the fluid chamber to the exhaust passage when the spool is at a first range of positions.

4. The active surge chamber of claim 3, wherein the seal or seals are also configured such that fluid flow from the pressurised fluid supply to the fluid chamber and fluid flow from the fluid chamber to the exhaust passage is enabled when the spool is at a second range of positions.

5. The active surge chamber of claim 3 further comprising a shaft wherein,
   the shaft is connected to the diaphragm at one end and configured such that flexion of the diaphragm causes movement of the shaft; wherein the movement of the shaft engages the spool and causes the spool to move.

6. The active surge chamber of claim 5 further comprising an annular space wherein, the spool surrounds the shaft;

the annular space is situated between the spool and a bore; and the annular space is always in fluid communication with the pressurised fluid supply when the spool is at a particular position along the shaft, the annular space is in fluid communication with the pressurised fluid supply and the fluid chamber so that fluid may enter the fluid chamber from the pressurised fluid supply via the annular space.

7. The active surge chamber of claim 5 wherein the shaft is configured to move a first distance before engaging the spool such that the diaphragm may be flexed by a predetermined amount without causing movement to the spool.

8. The active surge chamber of claim 5 wherein the shaft further comprises an end flange located near the opposite end to that which is connected to the diaphragm and a pair of shaft seal flanges flanking a shaft seal located around the shaft at any position, such that flexion of the diaphragm causes contact of the end flange or one of the shaft seal flanges of the pair of shaft seal flanges with the spool in order to effect spool movement.

9. The active surge chamber of claim 1, further comprising a piston coupled for movement with the diaphragm and having a seal surrounding the piston allowing slidable movement of the piston in a secondary chamber which is in fluid communication with the fluid chamber, wherein pressure of the fluid in the secondary chamber acts on the piston to provide an additional force on the diaphragm.

10. The active surge chamber of claim 9, wherein the fluid in the secondary chamber applies a force upon a flat surface of the piston head and wherein an opposing surface of the piston head and piston rod does not interface with the pressurised fluid of the fluid chamber or the secondary chamber.

11. The active surge chamber of claim 9 further comprising a duct, wherein the fluid chamber is in fluid connection with the secondary chamber via the duct.

12. The active surge chamber of claim 9, wherein the piston is coupled for movement with the diaphragm via connection with a shaft.

13. The active surge chamber of claim 9, further comprising a gap below the piston configured to channel fluid flow to an exhaust passage if the gap comes into fluid connection with the fluid chamber.

14. An active surge chamber for use with a pump in a paint supply system, the active surge chamber comprising:

a paint channel;

a fluid chamber having an exhaust passage, an inlet for connection to a pressurised fluid supply and being sealingly separated from the paint channel by a diaphragm;

a spring arranged to exert a force on the diaphragm;

a spool responsive to flexing of the diaphragm to move between a charging position, in which the inlet of the active surge chamber is opened to admit pressurised fluid while the exhaust passage is closed, and an exhausting position in which the inlet is closed and the exhaust passage is opened, movement of the spool including an intermediate position in which both the inlet and the exhaust passage are closed, wherein, the force exerted by the spring on the diaphragm restricts movement of the diaphragm over a range of paint pressures in order to attenuate the movement of the spool in the intermediate position; and a fluid reservoir wherein the fluid reservoir is connected to the fluid chamber in order to increase an overall volume of the chamber.

15. The active surge chamber of claim 14 further comprising at least one seal located on the spool wherein;

when the spool is at the charging position, one of the at least one seals prevents fluid from entering a pressure relief outlet; and when the spool is at the exhausting position, one of the at least one seals prevents fluid from the pressurised fluid supply from entering the fluid chamber.

16. The active surge chamber of claim 14 further comprising a shaft wherein, the shaft is connected to the diaphragm at one end and configured such that flexion of the diaphragm causes movement of the shaft; and movement of the shaft engages the spool and causes the spool to move.

17. The active surge chamber of claim 16 wherein the shaft is configured to move a first distance before engaging the spool such that the diaphragm may be flexed by a predetermined amount without causing movement to the spool.

18. The active surge chamber of claim 14 further comprising a piston coupled for movement with the diaphragm and having a piston seal surrounding the piston allowing slidable movement of the piston in a secondary chamber which is in fluid communication with the fluid chamber, wherein pressure of the fluid in the secondary chamber acts on the piston to provide an additional force on the diaphragm.

* * * * *